United States Patent [19]

Burk

[11] Patent Number: 5,666,791
[45] Date of Patent: Sep. 16, 1997

[54] VEHICLE AIR CONDITIONER CONDENSER INSERT

[75] Inventor: Roland Burk, Stuttgart, Germany

[73] Assignee: Behr GmbH & Co., Germany

[21] Appl. No.: 493,459

[22] Filed: Jun. 22, 1995

[30] Foreign Application Priority Data

Jun. 22, 1994 [DE] Germany .................. 44 21 834.6

[51] Int. Cl.⁶ ............................................. F25B 43/00
[52] U.S. Cl. ...................................... 62/474; 62/509
[58] Field of Search ............................ 62/474, 509, 512, 62/473; 165/110, 132

[56] References Cited

U.S. PATENT DOCUMENTS

| | | | |
|---|---|---|---|
| 2,557,557 | 6/1951 | Newcum | 62/474 |
| 2,600,435 | 6/1952 | Shapiro | 62/474 |
| 2,705,405 | 4/1955 | Uhlman | . |
| 3,064,819 | 11/1962 | Jones | 62/474 |
| 3,759,062 | 9/1973 | Wrenn et al. | . |
| 5,159,821 | 11/1992 | Nakamura | 62/509 |

*Primary Examiner*—John M. Sollecito
*Attorney, Agent, or Firm*—Evenson, McKeown, Edwards & Lenahan, P.L.L.C.

[57] ABSTRACT

For a collector of a condenser of a vehicle air conditioner, an insert is provided which can be inserted into the collector and which is composed of two parts. One part contains a filter screen, whereas the other part is an extension part bridging the distance from the first part to the cover of the collector. This arrangement provides for production of the collector in a particularly economic manner and minimizes disposal problems.

15 Claims, 2 Drawing Sheets

VEHICLE AIR CONDITIONER CONDENSER INSERT

The invention relates to an insert for a condenser of a vehicle air conditioner, the insert being insertable in a tube-shaped collector of the condenser between a bottom and a detachable cover and containing a filter screen through which the refrigerant flows. The condensor shown in FIG. 1 of U.S. Pat. No. 5,159,821 is incorporated herein by reference.

It is an object of the invention to provide an insert of the initially mentioned type which can be produced in a particularly economical manner and which, after an exchange, represents a small amount of waste to be disposed of.

This object is achieved in that the insert is composed of two parts, one part containing the filter screen and another part being constructed as an extension part bridging the distance from the first part to the cover.

The construction according to the invention permits a low-cost, simple manufacturing. The part which contains the filter screen and which requires higher manufacturing expenditures may be standardized for several sizes of condensers so that it can be produced in the same shape in large piece numbers. Depending on the size of the condenser and therefore of the collector, it is supplemented by an extension part which has a relatively simple shape and can therefore be produced at a reasonable price in different lengths by means of a modular-construction tool. In addition, the construction according to the invention reduces the amount of waste to be disposed of because it will be sufficient to exchange and dispose of the part with the filter screen. The extension part can easily be reused after an exchange of the part with the filter screen.

In an advantageous development of the invention, it is provided that the two parts are connected with one another in the axial direction of the collector by means of a separable form-locking connection. As a result, it is easily possible to also pull out the part containing the filter screen by means of the extension part which is accessible after the cover is detached.

In a further development of the invention, it is provided that the part containing the filter screen is designed as a tube-shaped container for dryer granules or pellet bulk provided with a multitude of openings and an intermediate bottom. This provides the part constructed as the container with another function, specifically with the function of receiving dryer granules. Also when the dryer granules are exchanged and disposed of, only this part which is constructed as a container must be exchanged and disposed of and can be constructed as a standard component for a large number of condensers of different sizes.

Normally, the dryer granules are arranged in a small bag. However, in a further development of the invention, it is provided that the container is equipped with a screen which holds back the dryer granules. As a result, it becomes possible to pour the dryer granules directly into the container and to do without the small bag.

In a further development of the invention, it is provided that the extension part projects into the tube-shaped container by means of a portion which is spring-loaded in the axial direction. As a result, it is possible to compress and fix the dryer granules which were poured loosely into the container or are arranged in a small bag. Particularly in the case of vehicle air conditioners, this is an advantage because it will then be avoided that, as a result of jolting, the components of the dryer granules move with respect to one another and therefore lead to an abrasion of material.

In a further development of the invention, it is provided that the tube-shaped container is provided on its upper end with flexible tongues which are arranged in the manner of a ring and are locked with a plate-type projection of the extension part. As a result, a locking, form-fitting connection can be obtained in a simple manner between the container and the extension part. In this case, it is advantageous for the flexible tongues to be provided, in the area of detent receiving devices for the plate-type projection of the extension part, with thickenings which are supported on the interior wall of the collector. These thickenings ensure that the plate-shaped projection inside the collector cannot detach from the container because the flexible tongues cannot escape in the radial direction. The form-locking connection will therefore be maintained as long as the area of the flexible tongues is situated inside the tube-shaped collector.

In a further development of the invention, it is provided that the extension part is constructed as a rod which is provided on at least one point with guiding elements which are supported on the interior wall of the collector. This type of an extension part can be easily manufactured at low expenditures of material while it is nevertheless centered inside the tube-shaped collector. In a further development, it is provided that at least one guiding element is constructed as a spring ring which is arranged in an axial plane of the rod. This ensures that the two parts of the insert are clamped in between the bottom and the cover of the tube-shaped collector. Furthermore, the spring ring offers the advantage that a hook-shaped tool can very easily be applied to it by means of which the insert consisting of the two parts can be pulled out of the tube-shaped collector.

Additional characteristics and advantages of the invention are found in the following description of the embodiment illustrated in the drawing.

Figure 1:
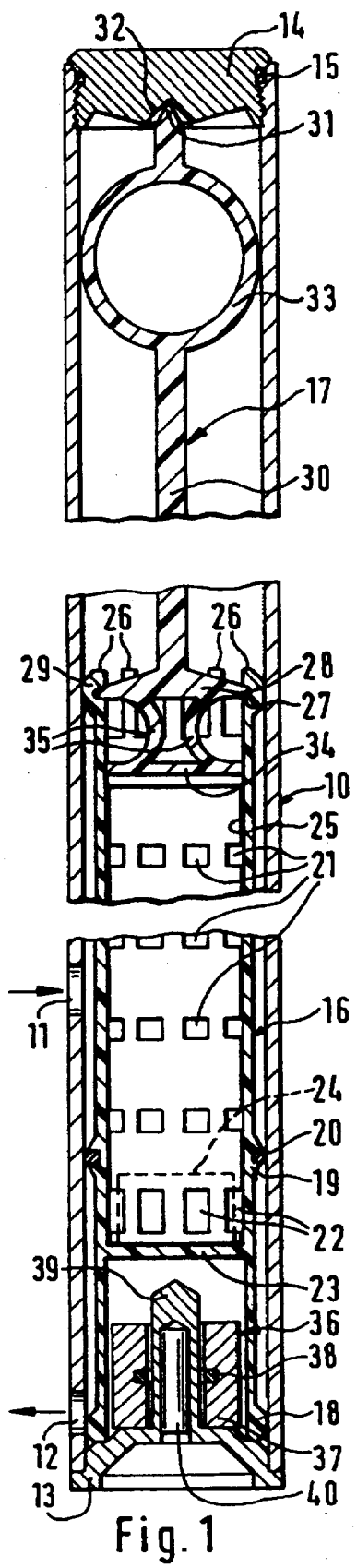
FIG. 1 is an axial sectional view of a tube-shaped collector of a condenser with an insert according to the invention.
Figure 2:
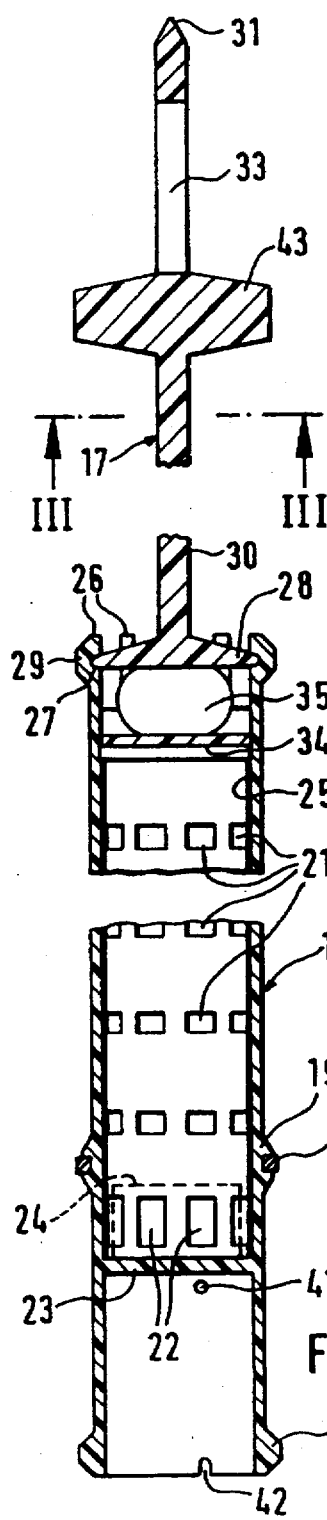
FIG. 2 is an axial sectional view rotated by 90° of the insert of FIG. 1.
Figure 3:
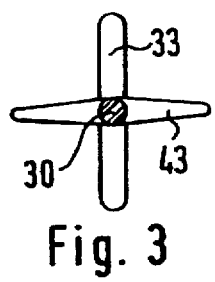
FIG. 3 is a sectional view along Line III—III of FIG. 2.
Figure 4:
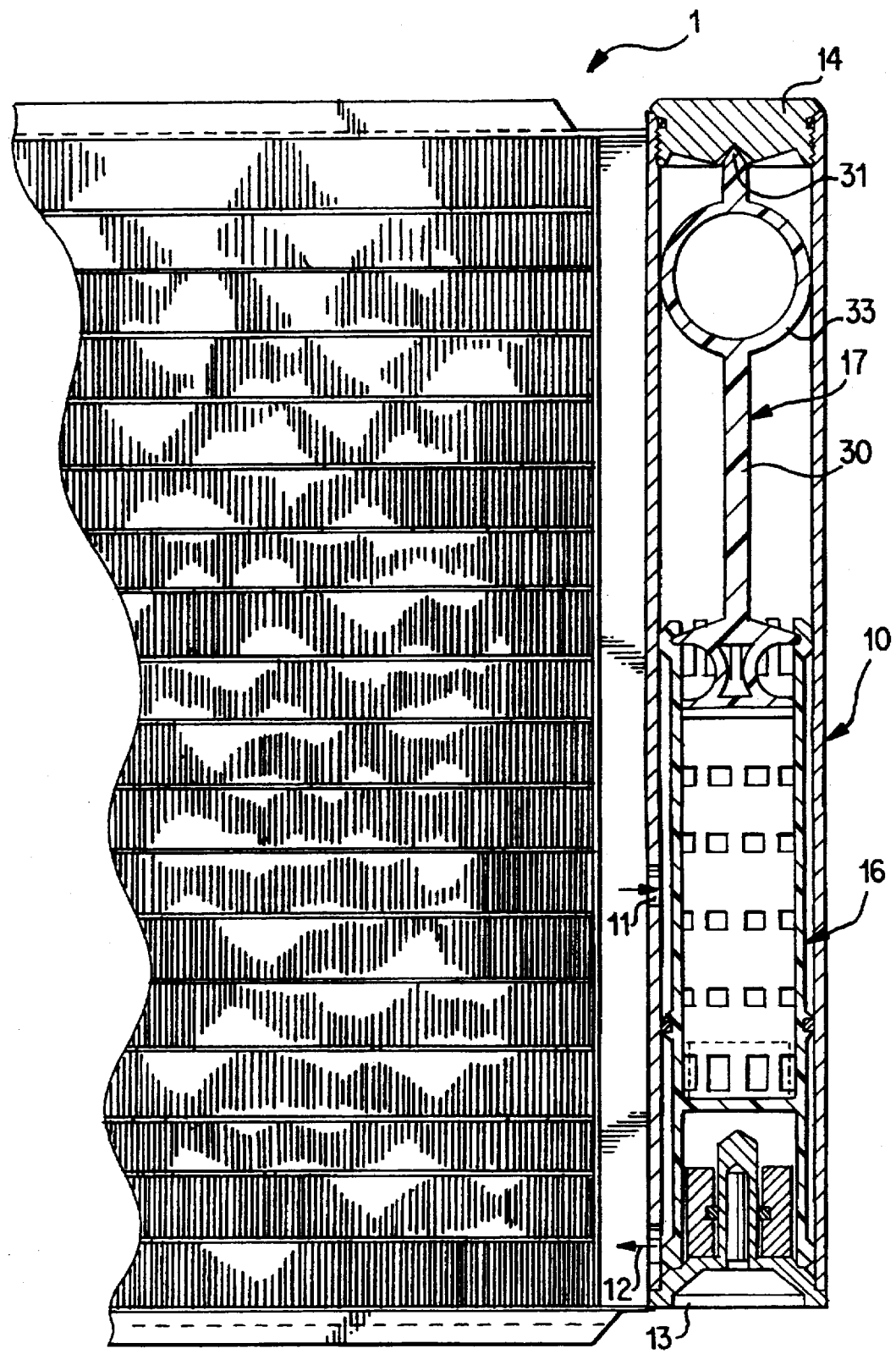
FIG. 4 is a schematic representation of the tube shape collector and insert in combination with the body of a condenser.

The tube-shaped collector 10 illustrated in FIG. 1 is a component of a condenser 1 of a refrigerating unit of an air conditioner of a motor vehicle. It is constructed as disclosed, for example, in German Patent Application P 44 02 927.6. The tube-shaped collector 10 is joined to a lateral collecting tube of a condenser with which it is connected by way of a feed opening 11 and an outlet opening 12. The collector 10 is provided with an inserted bottom 13 fixedly mounted by means of soldering or hard-soldering and is provided with a detachable cover 14. The cover 14 is provided with an external thread which is screwed into an internal thread of the collector. In addition, a sealing ring 15 is arranged between the cover 14 and the upper end of the collector 10.

An insert is inserted in the collector 10 and is composed of a container 16 and an extension part 17. This insert 16, 17 is clamped in between the bottom 13 and the cover 14. The tube-shaped container 16, as an injection-molded plastic part, is composed of two half shells connected by means of a film hinge or is constructed in one piece. The lower open end which is supported on the bottom 13 is centered in the collector 10 by means of an outer torus or several thickenings 18. Between the feed opening 11 and the outlet opening 12 of the collector 10, the container 16 is provided with another torus 19 which has a ring groove for improving the sealing into which a sealing ring 20 is inserted which seals off the container 16 with respect to the interior wall of the collector 10. The refrigerant must therefore flow through the container 16 which is provided with a plurality of openings 21. A ring of openings 22, which have a larger cross-section than the openings 21, is situated below the sealing ring 20 and above an intermediate bottom 23 molded to the container 16. The openings 21 are therefore used as inlet openings for the refrigerant and the openings 22 are used as outlet openings.

In the area of the openings 22, a filter screen 24 is arranged which has a mesh width of approximately 0.06 mm to 0.1 mm. This filter screen 24 may be a filter nonwoven or a needle felt.

Inside the container 16, a dryer granule or pellet bulk is arranged which, in a first embodiment, is filled into a small bag made of filter material, such as needle felt. In the case of another embodiment, the dryer granules are poured directly into the container 16. In this case, the container 16 is provided on the inside with a supporting screen 25 in the area from the intermediate bottom 23 to the uppermost openings 21 or with correspondingly small openings 21. The container 16, which is made of plastic, particularly of polyamide, is molded around this supporting screen. It may consist of plastic or of special steel, the former having the advantage of being recyclable.

The extension part 17 is connected with the container 16 by means of a detachable, form-locking connection. A plurality of flexible tongues 26 extend in the axial direction from the upper end of the container 16 and are provided on the inside with a detent recess 27 which receive a plate-type projection 28 of the extension part 17. The flexible tongues 26, which are arranged in a ring shape, are provided with thickenings 29 on the outside in the area of the detent receiving devices 27, by means of which thickenings 29 they rest against the interior wall of the collector 10. As a result, it is ensured that, in the installed condition of the insert 16, 17, they cannot move to the outside so that the connection between the container 16 and the extension part 17 cannot open up. This ensures that the extension part 17 is centered in the area of the elastic tongues 16.

The extension part 17 consists essentially of a rod 30 which has a round cross-section and whose upper end is constructed as a point 31 which is centered in a conical indentation 32 of the cover 14. This centric support has the advantage that, when the screwable cover 14 is mounted or detached, no significant torque is transmitted to the insert so that the mechanical torsional strain to the insert is minimized. In the upper area closely below the point 31, the rod 30 is provided with a spring ring 33 which is situated in the axial plane and whose outside diameter is adapted to the inside diameter of the collector 10 in such a manner that there is a slight elastic deformation. Directly below the spring ring 33, two guide lugs 43 are provided which are offset with respect to the spring ring 33 by 90° C. and which support the rod 30 also on the inside wall of the collector 10. The extension part 17 is also a one-piece molded plastic part, particularly an injection-molded part, which may also be made of polyamide.

Below the plate-shaped projection 28, the extension part 16 is provided with a spring-loaded portion 34 which projects into the interior of the container 16. In the case of the embodiment, it is provided that this portion 34 is molded to the plate-shaped projection 28 by way of two leaf springs 35. The spring-loaded portion 34 has the purpose of compressing the dryer granules situated in the container 16 so that the individual granules can no longer move relative to one another even in the case of jolting. As a result, it is prevented that an abrasion of granules occurs which is caused by these jolting movements and which may lead to a clogging of the supporting filter 25 and/or of the filter screen 24. In the case of a modified embodiment, it is provided that the portion 34 is a separate component which is loaded by means of a metallic coil spring which, instead of the leaf springs 35, is arranged between the plate-type projection 28 and the portion 34.

By means of the intermediate bottom 23 of the container 36, a hollow chamber is created in the lower area of the collector 10 in which hollow chamber a level sensor 36 is arranged. The level sensor 36 consists of a float 37 which is arranged in this hollow chamber and carries a magnetic ring 38 and which is guided on an axial, inwardly directed pin 39 of the bottom 13. A sensor 40 is arranged in the hollow pin 39, particularly a Reed switch, which is assigned to the magnetic ring 38 of the float 37. So that the refrigerant will arrive in the hollow chamber situated between the intermediate bottom 23 and the bottom 13 of the collector 10, the container is provided in this area with at least one and preferably two openings 41, 42.

The above explanations show that the container 16 with the filter screen 24 and the optionally existing supporting screen 25 as well as the dryer granules arranged therein is the component which requires much higher manufacturing expenditures than the extension component 17. Because of the two-part manufacturing of the insert consisting of the container 16 and the extension part 17, it is possible to create a standardized container 16 which always has the same size and which can be used also for condensers of different sizes (heights). One extension part 17 respectively will then be assigned to this standardized container 16 and will correspond to the respective condenser size (axial length of the collector 10). As a result, on the one hand, the manufacturing will become less expensive because the correspondingly more expensive container 16 is a standardized component. In addition, there is the advantage that, in the case of an exchange, only the container 16 with the filter screen 24 and possibly the supporting screen 25 as well as the dryer granules must be exchanged, while the extension part 17, which after the removal of the insert can very easily be separated from the container 16 and connected again with it, can be reused. Even if in practice, the whole insert 16, 17 should have to be exchanged, there is the advantage that only the container 16 must be disposed of so that the expenditures for the waste disposal are significantly reduced.

I claim:

1. An insert for a condenser of a vehicle air conditioner, the insert being configured to be insertable in a tube-shaped collector of the condenser between a bottom and a detachable cover above the insert and containing a filter screen through which the refrigerant flows, comprising two parts, of which one part contains the filter screen and the other part is constructed as an extension part interconnected with the first part so as to bridge the distance from the first part to the detachable cover thereabove and thereby provide removability of the insert from the collector via gripping of the extension part.

2. The insert according to claim 1, wherein the parts are connected in a separable, form-locking connection in an axial direction of the collector.

3. The insert according to claim 1, wherein the one part is a tube-shaped container for dryer and is provided with a plurality of openings and with an intermediate bottom.

4. The insert according to claim 3, wherein the parts are connected in a separable, form-locking connection in an axial direction of the collector.

5. The insert according to claim 3, wherein the container includes a screen configured to hold back the dryer granules.

6. An insert for a condenser of a vehicle air conditioner, the insert being configured to be insertable in a tube-shaped collector of the condenser between a bottom and a detachable cover and containing a filter screen through which the refrigerant flows, comprising two parts, of which one part contains the filter screen and the other part is constructed as an extension part which bridges the distance from the first part to the cover, wherein the one part is a tube-shaped container for dryer and is provided with a plurality of openings and with an intermediate bottom, and the container is provided on the outside with a sealing ring, which is placed against an interior wall of the collector and is arranged above the intermediate bottom, and at least one ring of openings.

7. An insert for a condenser of a vehicle air conditioner, the insert being configured to be insertable in a tube-shaped collector of the condenser between a bottom and a detachable cover and containing a filter screen through which the refrigerant flows, comprising two parts, of which one part contains the filter screen and the other part is constructed as an extension part which bridges the distance from the first part to the cover, wherein the one part is a tube-shaped container for dryer and is provided with a plurality of openings and with an intermediate bottom, and the container includes a screen configured to hold back the dryer granules, and the container is provided on the outside with a sealing ring, which is placed against an interior wall of the collector and is arranged above the intermediate bottom, and at least one ring of openings.

8. The insert according to claim 6, wherein the openings are provided with a fine filter.

9. The insert according to claim 3, wherein the extension part has a portion arranged to project into the container and to be spring-loaded in an axial direction of the container.

10. An insert for a condenser of a vehicle air conditioner, the insert being configured to be insertable in a tube-shaped collector of the condenser between a bottom and a detachable cover and containing a filter screen through which the refrigerant flows, comprising two parts, of which one part contains the filter screen and the other part is constructed as an extension part which bridges the distance from the first part to the cover, wherein the one part is a tube-shaped container for dryer and is provided with a plurality of openings and with an intermediate bottom, and the container is provided on an upper end thereof with elastic tongues arranged in a ring-like manner and locked with a plate-type projection of the extension part.

11. The insert according to claim 10, wherein, in an area of detent receiving devices for the plate-type projection, the elastic tongues are provided with thickened portions supported on an interior wall of the collector.

12. The insert according to claim 1, wherein the extension part has a receiving device for a hook-shaped tool.

13. An insert for a condenser of a vehicle air conditioner, the insert being configured to be insertable in a tube-shaped collector of the condenser between a bottom and a detachable cover and containing a filter screen through which the refrigerant flows, comprising two parts, of which one part contains the filter screen and the other part is constructed as an extension part which bridges the distance from the first part to the cover, wherein the extension part is a rod which, at least at one point, is provided with guiding elements supported on an interior wall of the collector.

14. The insert according to claim 13, wherein at least one of the guiding elements is a spring ring arranged in an axial plane of the rod.

15. The insert according to claim 3, wherein at least one of the container and the extension part is a molded plastic part.

* * * * *